Spec# UNITED STATES PATENT OFFICE.

EMILE BUTTE, OF WARREN POINT, NEW JERSEY.

COMPOSITION OF MATTER FOR WEIGHTING SILK YARNS AND FABRICS.

1,154,174.

Specification of Letters Patent.

Patented Sept. 21, 1915.

No Drawing.

Application filed June 15, 1915. Serial No. 34,237.

*To all whom it may concern:*

Be it known that I, EMILE BUTTE, a citizen of the United States, residing at Warren Point, in the county of Bergen and State of New Jersey, have invented a new and useful Composition of Matter for Weighting Silk Yarns and Fabrics, of which the following is a specification.

My composition is made from the following substances, combined substantially in the proportions described, viz: sodium carbonate one pound, hydrochloric acid one half pint, granulated sugar six ounces, sulfuric acid two and one half tablespoonfuls, water one pint. These substances are to be thoroughly mingled by agitation.

In using the above named composition, the the silk should first be freed from all gum and impurities by washing. The silk so cleaned is then placed in the tubs and dyed to the color or shade desired and dried in the usual manner followed by the trade. The silk so dyed and dried is then submerged in the solution and passed through the same once. The silk should then be removed from the solution, and dried by the centrifugal process usually followed by the trade.

By the use of the above composition, weight and body is speedily accumulated by the silk and the silk while retaining all that portion of the substance, which can be converted into silk yarn and manufactured fabrics is at the same time weighted to the original weight of which it consisted at and before the removal of the gum and impurities while in the raw state.

I am aware that a composition or compositions known to the trade as block tin and gambier are used by the trade for the purpose of weighting silk. My composition differs from the use of block tin and gambier, as follows: Block tin and gambier must always be applied to the silk after the removal or stripping of the gum and impurities from the silk and can never be applied after the silk has been dyed. Silks to which weight is being applied by the use of block tin or gambier are required to remain submerged in the solution containing those ingredients for a number of hours.

My composition can be applied after the silk has been dyed or manufactured into the finished product and does not require being submerged in the solution longer than a single passage through the solution, when it can be immediately removed from the solution, centrifuged and dried in the usual manner followed by the trade. I am also aware that all the substances used in making my composition are used in the general operation of the silk dyeing business for one purpose or another, but I am not aware of all of these substances having been used together for the purpose of weighting silk.

I claim:

1. The herein-described composition of matter, consisting of the reaction products of sodium carbonate, hydrochloric acid, granulated sugar, sulfuric acid and water, substantially in the proportions described and for purposes specified.

2. A composition of matter for the weighting of silk yarns and fabrics consisting of the reaction products of $Na_2CO_3$, $HCl$, sugar, $H_2SO_4$, and water in the proportions of 1 pound $Na_2CO_3$, $\frac{1}{2}$ pint $HCl$, 6 oz. sugar, $2\frac{1}{2}$ tablespoonfuls $H_2SO_4$ and 1 pint water.

EMILE BUTTE.

Witnesses:
CLINTON L. KIMBALL,
ROBT. A. SMITH.

Copies of this patent may be obtained for five cents each, by addressing the "Commissioner of Patents, Washington, D. C."